No. 758,650. PATENTED MAY 3, 1904.
P. C. HEWITT.
ELECTRODE FOR VAPOR ELECTRIC APPARATUS.
APPLICATION FILED JAN. 13, 1904.
NO MODEL.
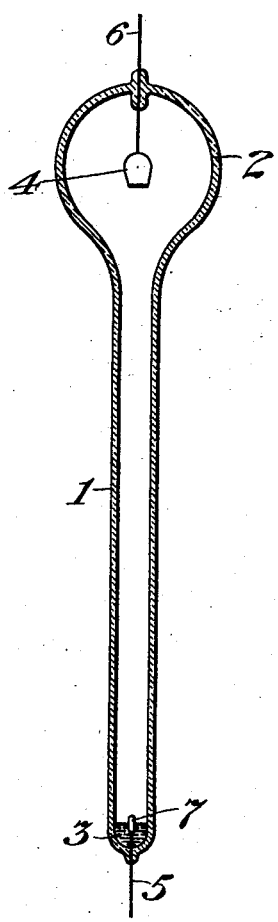

No. 758,650. Patented May 3, 1904.

UNITED STATES PATENT OFFICE.

PETER COOPER HEWITT, OF NEW YORK, N. Y., ASSIGNOR TO COOPER HEWITT ELECTRIC COMPANY, A CORPORATION OF NEW YORK.

ELECTRODE FOR VAPOR ELECTRIC APPARATUS.

SPECIFICATION forming part of Letters Patent No. 758,650, dated May 3, 1904.

Application filed January 13, 1904. Serial No. 188,836. (No model.)

*To all whom it may concern:*

Be it known that I, PETER COOPER HEWITT, a citizen of the United States, and a resident of New York, county of New York, State of New York, have invented certain new and useful Improvements in Electrodes for Vapor Electric Apparatus, of which the following is a specification.

In the operation of a vapor electric device where the "negative electrode resistance" is comparatively small this resistance is apt to be irregular. The current enters the negative electrode at a spot and has the tendency to be constantly wandering over its surface, being visible as a bright wandering spot or flame. I have found that this may be overcome under the same conditions and that the resistance may be made stable. I have also discovered that physical or chemical disintegration takes place at the point where the current enters the negative electrode and that by constructing the electrode so that physical or chemical change will take place at a predetermined spot more easily than another the current can be made to enter this spot and cease wandering over the surface of the negative electrode. In the case where the negative electrode consists of a volatilizable material this may be done by extending from it a point of metal or other material. This point when it becomes heated by the current will cause vaporization of the material forming the electrode on or at its surface of contact and consequent fixing of the entering of the current at that place. If this point be of such a material as becomes wetted by the material of the negative electrode, it then will act somewhat in the same manner as a wick and its operation appears certain and stable. The disintegration of the negative electrode at a particular spot may be brought about by chemical means and also by the physical character and shape of the electrode.

In the accompanying drawing I have shown one form of vapor device illustrating the invention.

Referring to the drawing, 1 represents an inclosing chamber, in the present instance in the form of a tube having an enlargement 2 at one end. This enlargement serves as a condensing and cooling chamber for the vapor of the negative electrode, which for convenience in this instance will be referred to as "mercury." The negative electrode is here shown as located at the end of the tube remote from the condensing-chamber 2, which has the negative electrode 3. The positive electrode 4 is represented within the condensing-chamber. Suitable leading-in conductors 5 and 6 are connected with the respective electrodes 3 and 4. The leading-in conductor 5 is here shown as being provided with an extension of platinum, as 7, projecting slightly above the surface of the negative electrode. This extension may be comparatively thin and, in fact, may be virtually a wire. When mercury is used as the negative electrode, platinum serves excellently as the material from which to form the point 7.

The particular device here shown is represented in the form especially suited for electric illuminating purposes; but the same principle applies when the device is used for transformers or other purposes.

I claim as my invention—

1. In an electric vapor device of the character described, a fluid electrode, and a point of solid conducting material projecting above the surface thereof.

2. In an apparatus of the class described, an electrode of mercury having a solid conducting material projecting above the surface thereof.

3. In an apparatus of the class described, an electrode of mercury having a body of platinum projecting above the surface thereof.

4. In a gas or vapor electric device having a liquid negative electrode, steadying means at the negative electrode comprising a solid wetted material in contact therewith, the general surface of the solid being in a different plane from the general surface of the liquid.

Signed at New York, in the county of New York and State of New York, this 6th day of January, A. D. 1904.

PETER COOPER HEWITT.

Witnesses:
WM. H. CAPEL,
GEORGE H. STOCKBRIDGE.